United States Patent [19]

Schueler

[11] Patent Number: 5,412,932
[45] Date of Patent: May 9, 1995

[54] MOTOR-POWERED LAWN MOWER

[75] Inventor: Robert A. Schueler, Franklin, Wis.

[73] Assignee: Textron Inc., Providence, R.I.

[21] Appl. No.: 288,403

[22] Filed: Aug. 10, 1994

[51] Int. Cl.6 .............................................. A01D 34/00
[52] U.S. Cl. ...................................... 56/249; 56/7
[58] Field of Search .......................... 56/6, 7, 249, 294

[56] References Cited

U.S. PATENT DOCUMENTS

| | | | |
|---|---|---|---|
| 3,429,110 | 2/1969 | Strasel | 56/7 |
| 3,511,033 | 5/1970 | Strasel | 56/7 |
| 3,759,019 | 9/1973 | Wells | 56/249 X |
| 3,905,180 | 9/1975 | Akgulian et al. | 56/7 |
| 5,170,613 | 12/1992 | Heise et al. | 56/249 |

Primary Examiner—Michael Powell Buiz
Attorney, Agent, or Firm—Arthur J. Hansmann

[57] ABSTRACT

A motor-powered lawn mower having a quick connect and disconnect pin interposed between the motor and the mower. A motor support member with a grease cavity is provided for receiving the motor, and the motor and the mower reel shaft are on the same axis. The grease cavity has an air vent which is incorporated in the quick release pin.

21 Claims, 3 Drawing Sheets

MOTOR-POWERED LAWN MOWER

A motor-powered lawn mower which is arranged for quick connect and disconnect of the reel relative to the powering motor and the remainder of the machine.

BACKGROUND OF THE INVENTION

The invention is particularly applicable to gang mowers where three or more reel-type mowers are mobily supported by a tractor or the like. The mowers of this invention are particularly suitable for extremely precise mowing, such as for a golf course green or putting surface. Those types of lawn mowers are reel mowers which are arranged to produce mowing and which catch the grass clippings in the mowing process. Examples of this type of lawn mower are shown in U.S. Pat. Nos. 3,429,110 and 3,511,033 and 3,905,180. That is, there is a reel-type gang mower which has the mowers supported on a tractor, and these mowers are powered by a hydraulic motor which has hydraulic lines connected from the tractor to the motor which is directly attached to the individual mowers.

The concern in this art is to be able to quickly detach and remove the mower from the rest of the machine so that the mower can be adjusted, sharpened, or otherwise serviced or replaced, as necessary. However, the present invention does not require the use of any bolting or other attachment of the hydraulic motor to the mower and thus does not require that there be special wrenches or other tools for removing the reel or mower itself from the remainder of the machine, and such removal requires separating the hydraulic motor and its hydraulic lines from the mower itself.

The present invention provides an arrangement for quickly detaching the mower itself from the remainder of the machine, but to do so without requiring special tools or skills by which the mower is isolated from the remainder of the machine for the purposes mentioned. That is, the present invention provides for a quick disconnect, and likewise a quick connect, of the mower from the hydraulic system and the remainder of the machine. Also, the mower can be quickly disconnected from the support arm or the like of the tractor, and thus the mower unit is fully removed from the tractor in a quick and simplified procedure.

In accomplishing the aforementioned, it is also significant that the mower arrangement in this invention is an in-line arrangement of the mower reel axis relative to the driving motor axis, so that the two are in line and in compact relationship for ease of connecting and disconnecting and for simplification of overall structure and reliability of the driving function.

Still further, the connection between the mower and the motor is such to provide a cavity therebetween which can receive a lubrication, such as grease, so that the mower reel shaft can be supported in a greased bearing. Still further, the mounting arrangement mentioned is such that the grease cavity is vented for optimum condition of the greasing procedure. In accomplishing this objective, the quick connect arrangement is such that the grease cavity is sealed by means of the quick connection, and thus the connection and the sealing are achieved in the same single arrangement of the mechanism.

DETAILED DESCRIPTION OF THE PREFERRED EMBODIMENT

Figure 1:
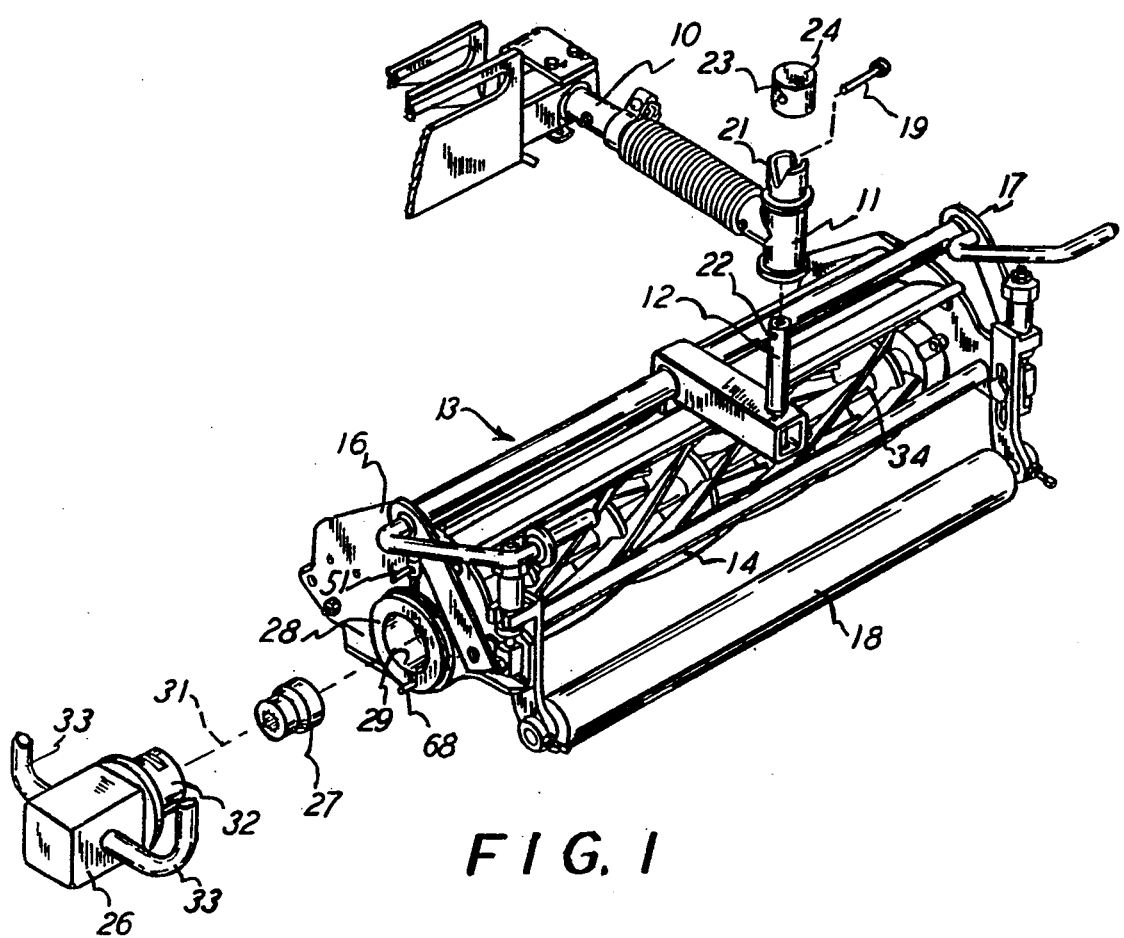
FIG. 1 is an exploded perspective view of a fragment of a mowing maching showing this invention.

FIG. 1 shows a portion of a mowing machine which is tractor mobilized and includes a forwardly extending tractor lift and push arm 10 which presents a vertical sleeve 11 for receiving a vertical post 12 on a reel-type mower designated 13. Thus, the tractor is arranged to mobilize the entire machine and to advance the mower 13 over the ground and to mow the grass by means of the rotating reel 14 which is rotatably supported in spaced apart side frames 16 and 17. A ground-engaging roller 18 is disposed in advance of the reel 14. The aforementioned is of a standard type mowing machine which includes the tractor and the mower, as mentioned, and it of course is of the nature disclosed fully in the aforementioned U.S. patents.

The mower 13 is connected to the tractor through the upstanding post 12 which is received in the sleeve 11 and which is retained therein by means of a pin 19 which extends in the upper V-shaped slot 21 and into the pin hole 22 in the upstanding post 12. Thus the mower 13 is releasably secured to the tractor, such as to the push arm 10, by means of the releasable pin 19 and this is a quick connect and disconnect attachment of the mower 13 relative to the tractor. The pin 19 also extends through a pin hole 23 in a cap 24 which fits over the upper end of the sleeve 21 in the assembled position, and of course it is understood that the heretofore described portion of the machine is in the exploded view format and the dot-dash line extending from the pin 19 to the slot 21 and down to the upstanding post 12 shows the line of assembly, in the conventional exploded view display which will be readily understood by one skilled in the art.

Likewise, FIG. 1 shows the exploded display of a motor 26 which is in driving relation with the reel 14 by means of a gear coupling 27, and again the dot-dash lines extending along the longitudinal axis of the parts mentioned indicate the assembly and positioning of the motor 26 onto the side frame 16 of the reel 13.

The mower side frame 16 receives and supports a bearing housing 28 which is generally annular in shape, as shown, and any suitable means of fixing the housing 28 with the side frame 16 is employed. The bearing housing 28 has a cylindrical cavity 29 extending on the exploded view axis 31, and that is the longitudinal axis of the parts being described. The gear coupler 27 nests within the cavity 29, and the motor 26 has a cylindrical extension 32 which is snugly received in the cylindrical cavity 29 such that the motor 26 is in cantilever support and relationship on the mower 13 in the assembled position. As such, motor 26 is in rotation driving relationship to the reel 14 and it is in sturdy and stable position relative to the mower 13.

In the preferred embodiment, the motor 26 is a hydraulic motor having hydraulic lines 33 connected with the motor 26, and of course the lines 33 extend in an unshown connection with the unshown tractor, but the connection could of course be such as that well known in the art or as shown in the aforementioned U.S. patents. Accordingly, the entire hydraulic drive to the mower 13 is attached to the mower in a manner more fully described hereinafter, and it is the quick connect and disconnect type of attachment of the driving motor 26 in line or on the axis of the reel 14 and that is the feature of this invention.

Figure 2:
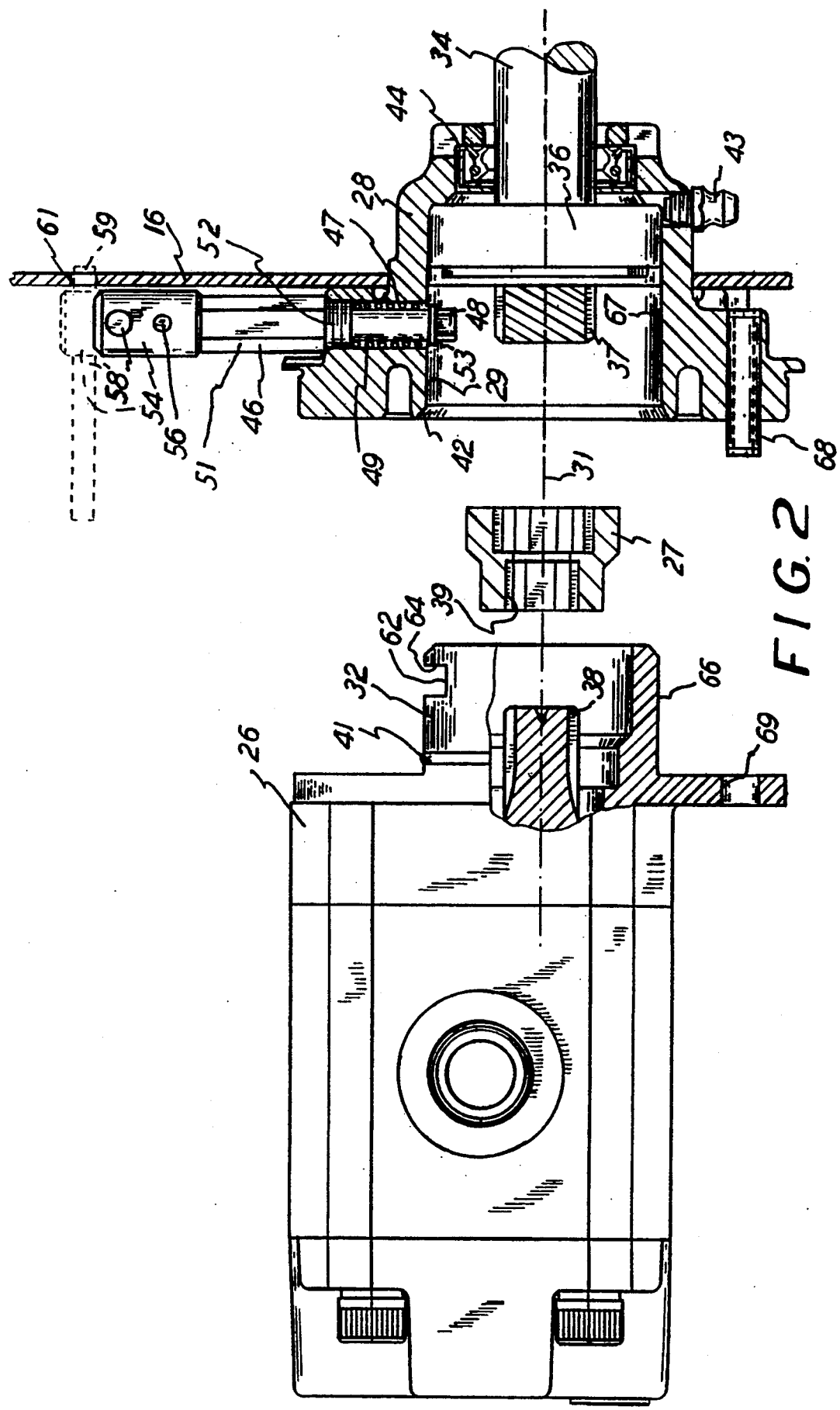
FIG. 2 is a front elevational and partly sectional and enlarged exploded view of parts shown in FIG. 1.

FIG. 2 therefore shows the reel shaft 34 which is rotatably supported in the bearing housing 28 by means of a rotation bearing 36. The end of the shaft 34 has gears 37 which are engaged by the coupler 27 when the latter is disposed within the housing cavity 29, as mentioned. Similarly, the motor 26 has a shaft 38 with teeth thereon and is received within the coupler opening 39 to be in driving relation with the coupler 27. That is, the motor 26 has its extension 32 snugly disposed within the cylindrical cavity 29, and the intervening coupler 27 provides the drive connection between the motor shaft 38 and the mower shaft 34.

In the assembled position, an 0-ring 41 extends endlessly around the motor cylindrical extension 32 and is disposed in contact with a chamfered recess 42 in the bearing housing 28. When assembled, the bearing cavity 29 is enclosed, except for a vent which will be described hereinafter. As such, the cavity 29 will retain grease, which can be supplied by means of the grease fitting 43 extending into the portion of the cavity 29 adjacent the bearing 36. A grease seal 44 is interposed between the housing 28 and the shaft 34, as shown.

Figure 3:
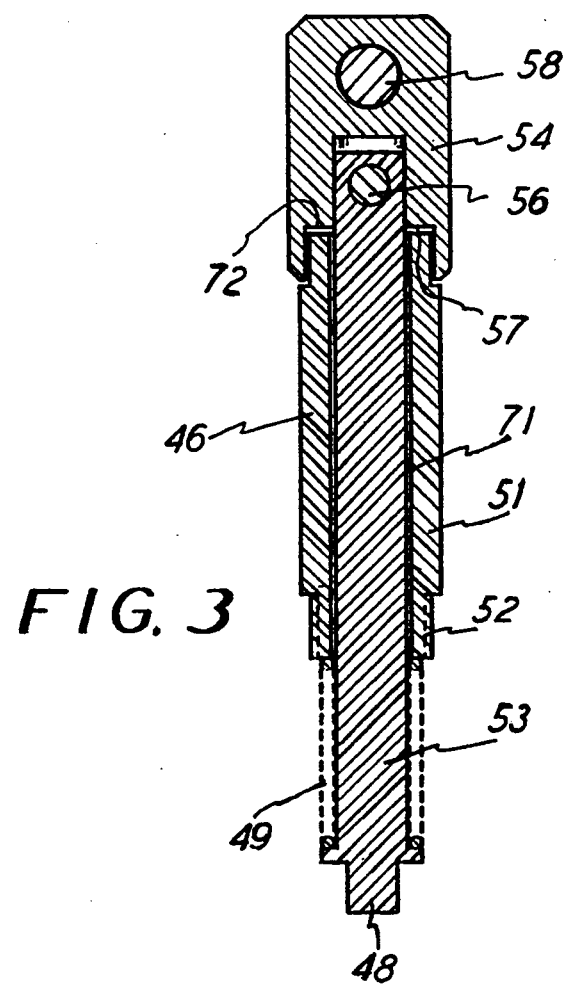
FIG. 3 is a vertical sectional view of a portion of FIGS. 1 and 2.
Figure 4:
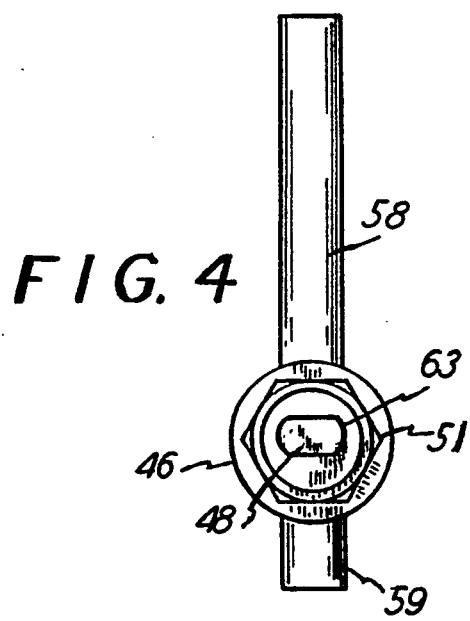
FIG. 4 is a bottom plan view of FIG. 3.

A quick connect and disconnect fastener is utilized for releasably retaining the motor 26 on the combined mower frame 16 and bearing housing 28. That is, a pin 46 extends through an opening 47 in the housing 28 and the pin lower end 48 extends into the cavity 29 and that is achieved by means of a compression spring 49 which urges the pin 46 downwardly to the position shown in FIG. 2. In detail, the pin 46 has a sleeve 51 which is threaded into the bearing housing opening 47 by the threaded sleeve end 52. Thus the sleeve 51 is in fixed position relative to the bearing housing 28. FIG. 3 shows that the pin 46 also includes a center pintle 53 which is movable along the up-and-down longitudinal axis of the pin 51 to where the pin 53 can move to the downward position shown in FIG. 2 and that position is established by the pin cap 54 being attached to the pintle 53 by the cross pin 56, and the cap 54 therefore rests downwardly on the sleeve 51, such as at the shouldered portion 57. As such, the spring 49 urges the inner pin 53 downwardly into the cavity 29 and to the limit of the cap 54 engaging the sleeve 51.

When it is desired to retract the pin end 48 from the cavity 29, the pintle 53 is urged upwardly against the spring 49, such as by raising the cap 54 through a lift arm 58 pinned into the cap 54, and that raised position can be the dotted position shown in FIG. 2 which will therefore have moved the pin lower end 48 upwardly and out of the cavity 29. In that released or raised position, the pin arm 58 has an end 59 which projects into an opening 61 in the mower frame 16, and thus the pin 51 is held in the retracted position when the cap 54 is raised and rotated approximately 90 degrees from the full line position shown in FIG. 2 to the dotted position shown in FIG. 2 and that is when the arm end 59 is positioned within the retaining opening 61.

The pin lower end 48 secures the motor 26 in the bearing housing 28 by means of projecting into an upwardly facing groove 62 in the motor extension 32. Of course that is when the pin 53 is released and downward, such as in the position shown in FIG. 2. Further, the pin end 48 has a camming surface 63 which presses against the wall 64 of the groove 62 for forcing the motor extension 32 into the cavity 29 such that the motor 26 is securely held on the bearing housing 28. Also, in that camming action, the O-ring 41 is forced against the chamfer 42 for the grease seal therebetween.

That is, the pin end 48 is retracted from the cavity 29 and the motor extension 32 is disposed in the cavity 29 and its cylindrical wall 66 is in snug sliding contact with the inner cylindrical wall 67 of the cavity 29. The pin 53 is then released, such as by moving the arm end 59 out of the frame hole 61 to allow the spring 49 to project the pin cam end 48 into the slot 62. Subsequently, upon rotation of the pin 53 its cam surface 63 bears against the groove wall 64 for the tightening action described.

To avoid rotation of the motor 26 relative to the housing 28, a pin 68 projects on the housing 28 and is received in an opening 69 on the motor 26. Of course the motor 26 and the reel shaft 34 are in line or co-axial, and the pin 68 is eccentric, and thus the quick connect and disconnect is in the co-axial arrangement and there will be no rotation of the motor 26 relative to the housing 28 because of the eccentric pin 68.

The pin 51 also serves as a fluid vent for the cavity 29 and the vent is established through the opening 47 and there is an annular space 71 between the sleeve 51 and the pin 53, as seen in FIG. 3, and there is also the opening at 72 between the cap 54 and the sleeve 51 and that opening 72 vents to the atmosphere.

In the arrangement mentioned, the action of pin 46, particularly the camming action described, provides the dual function of sealing with the O-ring 41 and securely holding the motor 26 on the bearing housing 28. All is achieved by a simple and readily achieved 90 degree rotation of the pin 51 which does not require any special tools or skills for the connect and disconnect. Further, the pin 51 can be held in the disconnect position by means of the pin end 59 being disposed in the frame opening 61. In that arrangement, the motor 26 is separated from the reel 13 and the hydraulic line 33 can remain attached with the motor 26 and need not be disconnected for any reason, but the reel is disconnected by means of release pin 51 and by the tractor attaching pin 19, all in the simplified manner described. In this arrangement, the mower frame 16 and the bearing housing 28 are described as a support for the motor 26 which can be quickly connected and disconnected from that support.

In the FIG. 2 position, the cam 63 is in the engaged mode. Thus the actuator arm 58 is shown parallel to the frame 16, and the arm 58 will be in that engaged mode because the frame 16 prevents the arm end 59 from rotating out of that cam-engaged mode. Only when the pintle 53 is raised against the downward force from spring 49 can the arm 58 be rotated to the disengaged mode shown by the dotted lines in FIG. 2, and that is when arm end 59 can enter the frame hole 61. So by observing the orientation of the arm 58, the user can see in which mode the fastener 51 is disposed.

Also, pin 68 and hole 69 serve to orient the motor 26 on the housing 28, and thus the groove 62 is properly positioned to receive the pintle 53.

What is claimed is:

1. A motor-powered lawn mower comprising a mower frame, a rotation-bearing housing mounted on said frame and having a cylindrical cavity with a longitudinal axis, a rotation bearing disposed in said housing and having a rotation axis co-axial with said longitudinal axis, a lawn mower reel having a reel shaft with a longitudinal axis and being rotationally supported on said bearing with said respective axes aligned for rotatably supporting said reel, a motor having a cylindrical extension therein snugly releasably telescoped in said cylindrical cavity to have said motor cantilever supported on said housing and have its cylindrical axis axially aligned with said reel shaft axis for the rotation of said reel, and a releasable fastener releasably connected between said housing and said motor and being operatively movable in a direction transverse to the telescoping axes of said housing and said motor for selectively engaging and disengaging said motor to releasably hold said motor in said cavity.

2. The motor-powered lawn mower as claimed in claim 1, including a lubrication sealer disposed intermediate said housing and said motor for sealing said cavity.

3. The motor-powered lawn mower as claimed in claim 2, wherein said fastener has an air vent in fluid-flow communication with said cavity for venting said cavity.

4. The motor-powered lawn mower as claimed in claim 2, wherein said lubrication sealer is an O-ring disposed contiguous to said cavity and surrounds said cylindrical extension for sealing compression in the direction parallel to said telescoping axes of said housing and said motor.

5. The motor-powered lawn mower as claimed in claim 1, including a connector engaged with both said housing and said motor for restricting relative rotation of said motor on said housing.

6. The motor-powered lawn motor as claimed in claim 1, wherein said releasable fastener is rotatable about said transverse direction and includes a cam arranged for effective camming action between said housing and said motor upon rotation of said fastener for forcing said motor cylindrical extension into said cavity.

7. The motor-powered lawn motor as claimed in claim 6, including a connector engaged with both said housing and said motor for restricting relative rotation of said motor on said housing.

8. The motor-powered lawn mower as claimed in claim 7, wherein said releasable fastener is movably mounted on said housing, and said cam projects into said cavity for releasable engagement of said cylindrical extension.

9. The motor-powered lawn mower as claimed in claim 8, wherein said cylindrical extension has a groove therein for receiving said cam in said camming action.

10. The motor-powered lawn mower as claimed in claim 7, including a lubrication sealer disposed intermediate said housing and said motor and being arranged to be compressed into sealing operation in the direction parallel to said axis, and said cam being arranged to force onto said motor in said direction parallel to said axis for the compressing of said sealer.

11. The motor-powered lawn mower as claimed in claim 1, including a spring operative on said fastener for releasably holding said fastener in engagement with said motor.

12. The motor-powered lawn mower as claimed in claim 11, including means interengageable between said fastener and said housing for releasably holding said fastener out of engagement with said motor for the removal of said motor from said housing.

13. The motor-powered lawn mower as claimed in claim 11, wherein said fastener includes a cam arranged for camming action between said housing and said motor upon rotation of said fastener for forcing said motor cylindrical extension into said cavity.

14. The motor-powered lawn mower as claimed in claim 13, including a connector engaged with both said housing and said motor for restricting relative rotation of said motor on said housing.

15. The motor-powered lawn mower as claimed in claim 1, including a tractor for mobily supporting said mower frame, an arm on said tractor, and a releasable connection between said arm and said mower frame and being adapted for quick release for the removal of said mower frame from said tractor.

16. A hydraulically powered lawn mower, comprising a mowing reel having a shaft presenting a rotation axis, a rotation support engaged with said shaft for rotatably supporting said reel on said axis, a hydraulic motor mounted on said support for driving said reel and having a rotation axis co-axial with said shaft axis, a releasable fastener interconnected between said support and said motor and being operable in a direction transverse to said axes for quick connect and disconnect of said motor relative to said support, and a rotation arrestor interconnected between said motor and said support for precluding rotation of said motor about said support.

17. The hydraulically powered lawn mower as claimed in claim 16, including a spring operatively associated with said fastener for releasably urging said fastener into the position of releasably securing said motor on said support.

18. The hydraulically powered lawn mower as claimed in claim 16, wherein said support and said motor are telescopically connected together, and said fastener is mounted on said support and includes a cam engaged with said motor for camming said motor into telescoped position on said support.

19. The hydraulically powered lawn mower as claimed in claim 18, wherein said support has a cavity on said axis, a rotation bearing in said cavity for rotation support of said reel, a lubrication sealer interposed between said support and said motor and surrounding said cavity for sealing said cavity upon the camming action on said motor, and a grease fitting on said support in grease-flow communication with said cavity for greasing said bearing.

20. The hydraulically powered lawn mower as claimed in claim 16, including an arm on said fastener for rotating said fastener between the connect and disconnect positions, said arm extending toward said support and being in abutment interference with said support in the connect position, and said support has an opening for receiving said arm to avoid said interference when said fastener is moved transversely and into said opening in the disconnect position.

21. The hydraulically powered lawn mower as claimed in claim 16, whwerin said support and said mower are telescoped together, said fastener and said motor respectively include a cam and a cam surface, and orientation means operatively connected between said support and said motor for orientation of said cam and said cam surface in the telescoped togetherness.

* * * * *